INVENTOR
EUGENE R. LUCKA

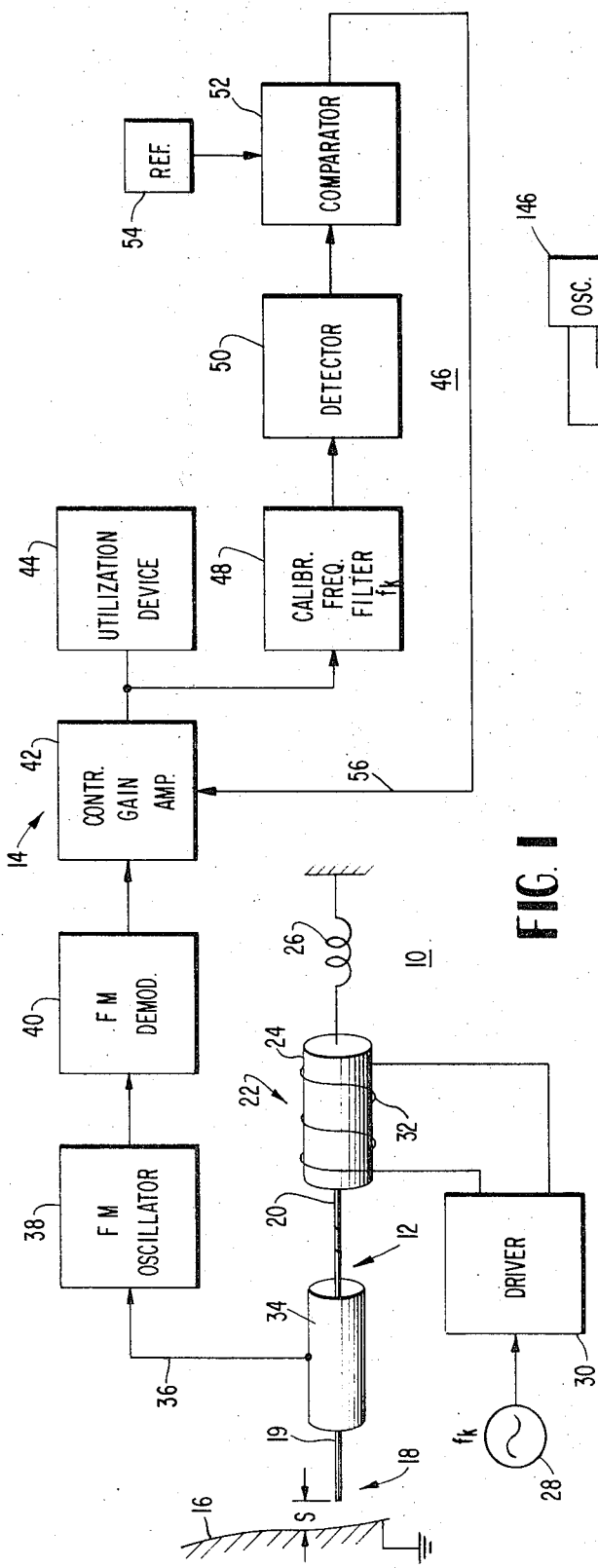

BY
*LeBlanc & Shur*
ATTORNEYS

United States Patent Office 3,555,416
Patented Jan. 12, 1971

3,555,416
NONCONTACT DISPLACEMENT PICKUP EMPLOYING COAXIAL SIGNAL COUPLING
Eugene R. Lucka, Columbus, Ohio, assignor to Reliance Electric Company, Columbus, Ohio, a corporation of Ohio
Filed Sept. 9, 1968, Ser. No. 758,428
Int. Cl. G01r 27/26, 33/00
U.S. Cl. 324—61
18 Claims

ABSTRACT OF THE DISCLOSURE

There is disclosed herein a noncontact proximity sensitive transducer employing a pickup responsive to distance dependent energy variations between a pickup and the object under inspection. The transducer includes means for generating a signal which is modified by the spacially dependent phenomenon measured by the pickup and suitable signal processing circuitry for extracting from the modified signal, the variations in the pickup to object spacing. The pickup is characterized by an elongated rod-like sensing member coaxially positioned within an elongated hollow cylindrical coupling member by which the pickup signal is coupled from the sensing element to the ancillary electronic circuitry.

---

The present invention relates to a noncontact proximity sensitive transducer system including a pickup and ancillary electronic signal processing circuitry and also to a signal coupling technique for transmitting an electrical output from the pickup to the processing circuitry. The signal coupling technique is particularly useful with a transducer system in which a controlled calibrating motion is applied to the pickup sensing element during operation.

Noncontact transducer systems for dimension and displacement measurement have been known for many years. Actually, prior to the advent of such systems, vibration was measured with contact pickups attached to the object under observation. Such pickups were responsive to the position of the object or to its motion, i.e., the movement of the pickup induced by the motion of the object was relied on to provide a measurable electrical signal. Such systems were subject to several disadvantages, however, including unsatisfactory low frequency response, limited dynamic range, etc. In addition, attachment of the sensing device to the object under inspection often disturbed the phenomenon being observed or, alternatively, subjected the surface under inspection to possible deflection or damage due to the physical contact.

Such difficulties led to attemps to develop suitable noncontacting transducer systems. These efforts were met with substantial difficulties in the area of calibration and standardization since non-contact transducers proved to be quite dependent upon enviornmental variations and inherent pickup non-linearity. These difficulties have been overcome in large measure by the employment of continuous calibration techniques such as disclosed in United States Pat. No. 3,180,136 in the name of George B. Foster, entitled, "Continuously Calibrated Displacement Measuring Transducer System."

Briefly, according to the technique of the aforementioned Foster patent, a pickup sensitive to energy variations in space is positioned close to but not in contact with the object under inspection and is subjected to a controlled cyclic variation in position relative to the object. Calibration is achieved by adjustment of the overall transducer system gain, i.e., sensitivity, based on comparison of the actual system response to the calibrating displacement with a desired or reference response.

In a variation of the above arrangement, the pickup is subjected to the calibrating vibration and also to a linear position variation to maintain a constant pickup-to-object spacing. In yet another variation, such as disclosed in copending application Ser. No. 515,533 filed Dec. 22, 1965, in the name of George B. Foster and entitled, "Noncontacting Displacement Gauge," now Pat. No. 3,452,273, dated June 24, 1969, the amplitude of the calibrating vibration is adjusted in response to the pickup to object spacing in such a manner as to maintain a constant ratio between the calibrating vibration amplitude and the spacing. In all of the arrangements described above, the use of the continuous calibration provides a practical and useful system yielding excellent results under a wide variety of operational conditions whereby the concept of a noncontacting transducer system has been transformed from a mere laboratory phenomenon to a practical and useful measuring instrument.

As will be appreciated, for practical reasons, the calibrating vibration should be imparted to the pickup element itself rather than to the entire transducer system. This requires a suitable means for coupling the sensing element electrically to the accompanying signal processing equipment. In the past, this has been accomplished by use of a suitable wire providing a direct electrical connection. The wire itself may be quite short, since, as explained hereinafter, at least a portion of the electronic processing circuitry should be positioned in as close proximity as is possible to the pickup sensing element itself. However, because of the vibartion of the sensing element, even a short connecting wire is subjected to motion which may cause pickup of substantial electrical noise. Such noise can be quite detrimental under certain circumstances and has resulted in consideration of alternative coupling techniques.

In devising a suitable coupling, one difficulty which has been encountered is in designing an arrangement which does not mechanically impede or otherwise affect the vibration of the pickup element, or excessively load the pickup drive and yet provides substantially constant noise-free coupling.

The present invention is therefore intended as a solution to the above stated problem. In accordance without embodiment, a noncontact capacitive pickup operates to sense variation of distance between the end of a needle-like sensing member and an object under inspection. Variation is manifested as a distance sensitive variable capacitance, and is coupled to ancillary electronic processing circuitry by a noncontacting coaxial coupler, e.g., of cylindrical configuration surrounding the pickup member and arranged to permit noncontacting axial vibration of the sensing member within the coupler. This produces a coaxial capacitor effectively in series with the pickup to object capacitance. The coupler itself is then directly coupled to the ancillary processing circuitry by means of a conventional wire which is not subjected to the movement of the pickup sensing member. As a result, a substantial reduction of extraneous noise resulting from coupling cable motion can be achieved without mechanical loading or other undesirable effects on the pickup drive mechanism.

In another embodiment, an axially driven variable reluctance sensing member is mounted within a bore in a magnetically permeable body member configuration with the sensing member protruding from the body. The device is positioned in proximity to the object under inspection so that relative movement between the sensing member and the object provides a variable reluctance for the magnetic path through the body, the sensing member and the air gap to the object under inspection. Electrical signals are coupled through the body itself rather than through the pickup sensing member, again allowing reduction of extraneous electrical noise due to connecting cable motion.

Accordingly, it is an object of this invention to provide an improved noncontact transducer system.

It is an additional object of this invention to provide an improved noncontact transducer system having improved nose characteristics in which a pickup sensing member is vibrated relative to an object under inspection.

It is a related object of this invention to provide such a system which eliminates the need for a moving wire coupling between the sensing member and the associated signal processing circuitry.

It is also an object of this invention to provide a signal coupling technique for a noncontact transducer system having a moving sensing member which avoids the necessity for a moving wire to couple electrical signals from the pickup sensing member to the associated electronic signal processing circuitry.

It is a further object of this invention to provide an improved noncontact transducer system employing a pickup and associated electronic signal processing circuitry and a signal coupler coaxially surrounding the pickup sensing member for coupling the electrical output of the pickup to the signal processing circuitry.

It is a related object of this invention to provide a noncontact transducer system as described above in which the pickup sensing member is a slender elongated rod coaxially disposed within, but not in contact with, a hollow conductive cylinder providing capacitive coupling between the sensing member and the electronic circuitry.

Its also a related object of this invention to provide a noncontact transducer system as described above employing a pickup exhibiting a distance-sensitive variable capacitance between the pickup sensing member and the object under inspection and the pickup sensing member.

It is a further object of this invention to provide a noncontact transducer system having a pickup and associated signal processing circuitry in whch the pickup exhibits a distance sensitive variable reluctance relative to the object under inspection and in which a pickup sensing member is subjected to a calibrating vibration through an elongated bore in the pickup body coaxially surrounding the pickup sensing element.

It is also an object of the invention to provide an improved noncontact transducer system including a pickup having movable and fixed portions and ancillary electronic circuitry, with electrical coupling from the pickup to the electronic crcuitry through the fixed pickup portion with substantially constant electrical coupling between the fixed and moving pickup portions.

It is a related object of this invention to provide an improved, noncontact transducer system as described above wherein the fixed and moving pickup portions are maintained in noncontacting relationship to each other.

It is a further related object of this invention to provide a noncontact displacement transducer as described above in which the moving portion of the pickup is a slender elongated rod-like member and where the fixed portion of the pickup member includes a member having a hollow cylindrical interior passage coaxially surrounding the elongated member.

The exact nature of this invention, together with other objects and advantages thereof, will become apparent from consideration of the following detailed description and the accompanying drawing in which:

FIG. 1 is a schematic diagram showing a noncontact transducer system in accordance wth this invention employing a capacitive pickup and coaxial signal coupling;

FIG. 2 is a schematic characterization of the electrical properties of the pickup of FIG. 1;

FIG. 3a is a graph of the capacitance between the moving and fixed members of the pickup of FIG. 1 as a function of variations of the positioning of the sensing member within the coupling member;

FIG. 3b is a schematic diagram defining the variables in FIG. 3a;

FIG. 7 is a schematic diagram of a modified version of this invention showing a variable reluctance pickup with coaxial signal coupling in accordance with this invention.

Figure 4:
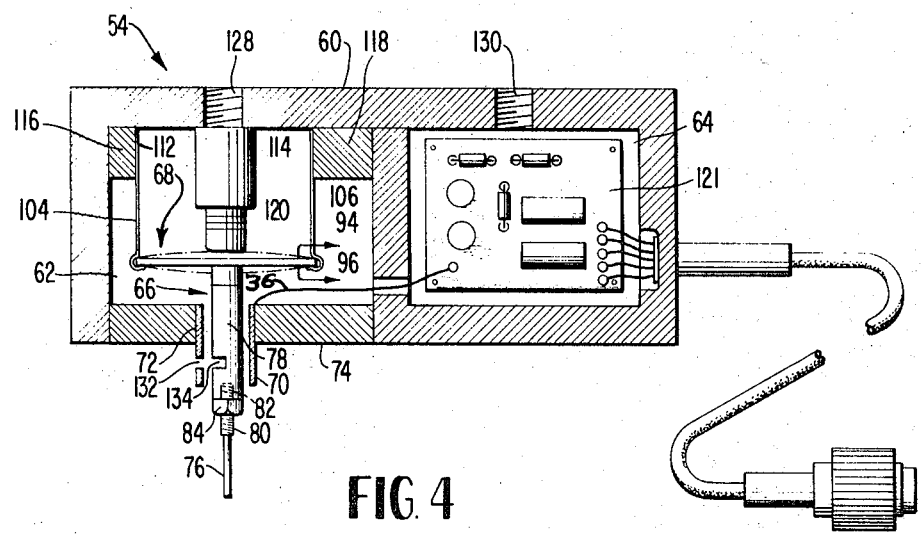
FIG. 4 is a detailed diagram of a practical embodiment of the noncontact capacitive pickup of FIG. 1.

Referring now to FIG. 1, there is shown at 10 a schematic representation of a noncontact transducer system, including a pickup 12 and associated electronic signal processing circuitry 14. Pickup 12 is adapted to be positioned in close proximity to but not in contact with an object 16 being inspected or observed. This may be a vibrating shaft or stationary object. The parameter to be measured is a time varying axial spacing S relative to the pickup.

For capacitive pickup 12 shown, there is provided a pickup sensing member 18 in the form of electrically conductive rod 19 mechanically coupled through an insulated spacer 20 to drive mechanism 22 shown schematically as a solenoid 24 coupled to a restraining spring 26. A calibraton signal source 28 is coupled through an electronic driver circuit 30 to the actuating coil 32 of solenoid 24 to provide the required axial calibrating vibration.

The improved coupling arrangement, also shown schematically in FIG. 1, includes an elongated cylindrical member 34 coaxially positioned around rod 19. Member 34 is fixed in position so the operation of drive mechanism 22 causes axial motion of the sensing member rod 19 within the coupling member. An electrical connection shown schematically at 36 connects coupling member 34 to the electronic signal processing circuitry 14, which includes a frequency modulated oscillator 38, an FM demodulator 40, a controlled gain amplifier 42, and a utilization device 44 to convert the output of controlled gain amplifier 42 into a useful measurement of the pickup to object spacing S. Adjustment of the gain or sensitivity of controlled gain amplifier 42 is provided by a gain control feedback circuit 46 including a calibration frequency filter 48, a signal detector 50, a comparator circuit 52 and a reference signal source 54. Feedback circuit 46 is connected to a gain control input of amplifier 42 indicated schematically by signal path 56.

With additional reference now to FIG. 2, if conductive rod 19 is maintained electrically isolated from the object 16 under observation and from ground, as by insulating spacer 20, there will be established a capacitance between the pickup sensing member and object 16. This capacitance will vary in some inverse fashion with the distance S. In addition, if coupling cylinder 34 is maintained electrically isolated both from ground and from pickup sensing member 19, then an electrical capacitance between the coupling member and the sensing member will also be established. This is illustrated in FIG. 2 where a capacitor C(S) between sensing member rod 19 and object 16 under inspection (assumed to be at ground potential as illustrated in FIG. 1), is in series with the coupling capacitor $C_c$ adapted to be connected by lead 36 to oscillator 38.

The advantages of this arrangement will be appreciated from reference to FIGS. 3a and 3b. FIG. 3a shows a graph of the capacitance $C_c$ between pickup rod member 19 and coupling cylinder 34. As will be appreciated, the axial calibrating motion induced by drive mechanism 22 will be substantially rectilinear, i.e., rod 19 will remain substantially coaxially disposed within the coupling cylinder. However, a certain degree of transverse motion is possible so that there will be an imperfect coaxial relationship between coupling cylinder 34 and the rod member 19. In that case, the rod will be deflected toward the cylinder wall, for example, in the direction +X illustrated in FIG. 3b. As a result, the capacitance between rod member 19 and the adjacent portion of coupling cylinder 34, i.e., in the region labeled 57 in FIG. 3b will increase since the capacitance is an inverse distance-sensitive function as noted above.

The obvious result of such an increase in capacitance is to introduce an unwanted variation in the pickup output. This is totally unrelated to the distance sensitive variation of interest—namely, the variation resulting from changes in pickup to object spacing S.

However, in accordance with this invention, such undesirable variation is compensated for since decrease in the distance in the direction +X is substantially balanced by an equal increase in the distance in the direction −X, i.e., away from region 58 shown in FIG. 3b.

The net effect of the foregoing is to maintain a nearly constant capacitance $C_c$ over substantial range of radial displacement. This relationship is illustrated qualitatively in FIG. 3a where it may be seen that a broad flat valley in the value of coupling capacitance $C_c$ exists even for large positive and negative values of X. Because of the inherent angular symmetry, the capacitance $C_c$ is nearly independent of the radial direction of the displacement ±X. In practice, the radial, i.e., nonrectilinear motion of sensing member rod may be made sufficiently small so that $C_c$ remains within the broad valley shown with the result that $C_c$ may be taken as essentially constant.

As illustrated in FIG. 2, the measurement capacitance C(S) is in series with the coupling capacitance $C_c$ and therefore the value of the latter should be substantially in excess of the former to assure maximum pickup sensitivity. In practice, it is found that the coupling capacitance $C_c$ should be at least about ten times the maximum expected pickup capacitance C(S) (the latter of course depending on the pickup geometry composition, average standoff distance, etc.) and preferably should be at least 20 times the measurement capacitance C(S) for the most satisfactory operation.

The foregoing conditions may be met in practice to produce a pickup with substantial sensitivity which obviates the need for a moving electrical wire connecting pickup sensing member 18 to electronic signal processing circuitry 14. In this regard, it should be noted that absent coupling cylinder 34, it would be necessary to connect coupling wire 36 directly to pickup member 18 in some suitable manner. While this can be done with no difficulty, and may be quite satisfactory in some instances, it does present the possibility of pickup of stray electrical noise due to the motion and the inherent shunt capacitance between the wire and ground, especially at high frequencies ordinarily associated with FM oscillator 38 as explained below. In addition it may result in mechanical interference with the vibration of the pickup sensing element by the calibration driver. Thus, by use of the coupling cylinder 34, which is maintained fixed in space relative to moving pickup member 18, coupling wire 36 may also be embedded in a low dielectric insulator or at least maintained fixed in space with resulting reduction of noise pickup or mechanical interference due to wire motion.

With reference again to FIG. 1, FM oscillator 38 may be of any suitable type adapted to operate at a relatively low radio frequency, e.g., on the order of about 5 mHz. A suitable oscillator configuration would be a transistorized Colpitts type oscillator including the pickup capacitance C(S) and the coupling capacitance $C_c$ in series in the frequency-determining feedback circuit of the oscillator. Alternatively, other suitable oscillators capable of operating in conjunction with the inherently small pickup capacitances characteristic of pickup 12, e.g., on the order of about 1 pf. or less, may be used.

Still referring to FIGS. 1 and 2, it will be appreciated that variations in the pickup to object spacing S will result in a corresponding variation in the capacitance C(S). The former variation may result, for example, from vibration of object 16, or from variations in the surface characteristics as the object passes transversely of sensing member rod 19. In addition, variation in pickup to object spacing S will result from the calibrating vibration at frequency $f_k$. Thus, the instantaneous pickup to object spacing S can be regarded as constituting a time variation, i.e. modulation of an average standoff distance. This time variation includes a component representative of vibration or surface variations and an additional component representing the calibrating vibration of pickup sensing member 18. Both of the foregoing result in modulation of the average value of the capacitance appearing on lead 36 at the input of FM oscillator 38.

Since the series capacitance circuit shown in FIG. 2 is connected in the frequency determining feedback circuit of oscillator 38, it may be seen that variations in the instantaneous pickup to object spacing S will change the resonant frequency of the oscillator. This produces a frequency modulation of the oscillator output functionally related to variations in pickup to object spacing such that the frequency deviation of the FM signal is related to variations in the magnitude of S while the frequency modulation rate is related to the various frequencies of instantaneous variation in S. These signal properties of the output of oscillator 38 must be recovered to permit further signal processing and actual measurement of the physical parameters being observed.

Accordingly, the output of modulation oscillator 38 is connected to FM demodulator 40 which operates in conventional fashion to produce a low frequency signal, the amplitude and frequency of which correspond to the underlying physical displacement phenomenon being observed. The demodulator output which may be termed an amplitude analog signal includes components representing the instantaneous value of the pickup to object spacing. As previously explained, this includes not only vibration and surface variations of the object under inspection but also the calibrating vibration at frequency $f_k$.

The amplitude analog signal is mathmatically somewhat complicated and the details of the processing of this signal are not directly the subject matter of this invention. Briefly, however, the amplitude analog signal is coupled through controlled gain amplifier 42 which operates as described below and is then provided to utilization device 44 where components representative of vibration or surface variations in the object under inspection may be suitably isolated and processed to obtain a measurement of the phenomenon being observed.

The calibration signal may also be extracted from the output of control gain amplifier 42 and may then be utilized to adjust the gain or sensitivity control gain amplifier 42 to provide the type of continuous calibration disclosed and claimed in the aforementioned Foster Patent No. 3,180,136. The calibration function referred to is accomplished by feedback control circuit 46 which includes calibration frequency filter 48, detector 50, comparator 52, and reference signal source 54.

To insure uniqueness of the calibration signal in relation to the various vibration or surface variation frequencies in the amplitude analog signal, the calibration frequency $f_k$ is ordinarily selected to lie outside of the anticipated measurement frequency spectrum. Accordingly, calibration frequency filter 48 should be responsive only to frequency $f_k$ and therefore is preferably a narrow band filter tuned to the calibration frequency. Alternatively, a high or low pass filter may be substituted, depending upon whether the frequency $f_k$ is above or below the expected measurement frequencies.

The output of calibration frequency filter 48 is representative of the signal response to the calibrating vibration which, as previously explained, is of accurately controlled amplitude. The signal response at this frequency constitutes the system response to a known input and therefore may be used to adjust overall system sensitivity so that the desired response to this known input is obtained. Thus, the output of filter 48 is connected to detector circuit 50 which may be of conventional construction including a suitable rectifier circuit and low pass filter to provide a DC signal representative of the peak or average value of system response to the calibration frequency signal.

The output of detector circuit 50 is coupled to comparator circuit 52. This may be a difference amplifier or equivalent signal subtraction circuit which receives as a reference input, a signal from reference source 54 corresponding to the desired response of the system to vibration at the calibrating frequency. The output of comparator 52 is therefore representative of the difference between the actual and desired system response at the calibration frequency. This difference signal is coupled over lead 56 to the control input of controlled gain amplifier 42 to adjust the overall system sensitivity to the signal at frequency $f_k$. The system is designed so that frequency response is essentially the same at the vibration or displacement frequency as at the calibration frequency so that accurate system calibration at all frequencies of interest is achieved rendering the system accurate independent of environmental variations or other parametric changes detrimental to system accuracy.

Figures 5, 6:
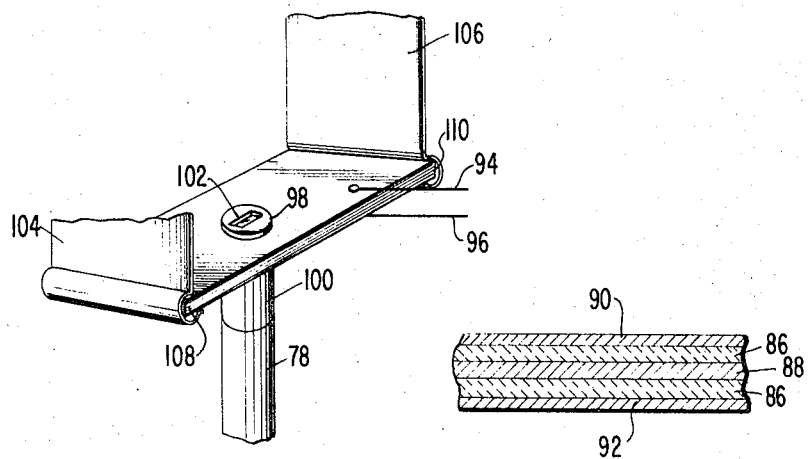
FIG. 5 is an enlarged perspective view of the suspension for the pickup sensing element.
FIG. 6 is a further enlarged cross sectional view of a portion of FIG. 5.

With reference to FIGS. 4 through 6, there is shown the construction of a practical noncontact capacitive pickup denoted at 54 in accordance with this invention.

As illustrated, pickup 54 includes a metal casing 60 formed with a pair of cavities 62 and 64 adapted to receive the various components of the pickup. Cavity 62 contains a pickup sensing member 66 a calibration drive mechanism 68 and signal coupling cylinder 70. The pickup sensing member 66 is supported solely by the calibration drive mechanism 68, while signal coupling cylinder 70 is rigidly supported in an aperture 72 in an end plate 74. The latter is preferably formed of a low dielectric insulating material, e.g., a suitable ceramic or other insulator to provide effective electrical isolation of coupling cylinder 70 from ground.

Pickup sensing member 66 is actually comprised of an elongated rodlike probe element 76 as previously mentioned and a signal coupling and support shaft 78. Probe element 76 is mounted in support shaft 78 by means of a threaded end portion 80 received in a complementary internally threaded bore 82 in shaft 78. This provides adjustable axial extension of the probe element. A lock nut 84 on threaded end portion 80 of rod 76 serves to lock the probe element in the desired axial position.

FIGS. 5 and 6 illustrate the construction of calibration drive mechanism 68. A variety of suitable drive mechanisms may be adapted for use in connection with the present invention but the preferred arrangement utilizes a piezoelectric crystal driver arrangement comprised of a pair of generally rectangular piezoelectric plates 86 separated by a central brass layer 88. Metallic coatings 90 and 92 are provided on the outer surfaces of piezoelectric plates 86 and are provided with electrical terminals 94 and 96 by which the calibrating drive signal is coupled to the drive mechanism. The composite structure is provided with a central aperture 98 for attachment of pickup sensing member support shaft 78, as by an insulating spacer 100 attached to the upper end thereof. Spacer 100 is secured in aperture 98 by means of a nylon screw 102 received in an internally threaded aperture.

The crystal driver itself is suspended within housing cavity 62 by means of a pair of generally rectangular metal springs 104 and 106 bonded to the ends 108 and 110, respectively, of the driver by means of a suitable epoxy resin. Springs 104 and 106 are secured at their upper ends 112 and 114 to a pair of supporting blocks 116 and 118 mounted at the upper end of cavity 62.

The drive mechanism illustrated in FIGS. 4 through 6 acts as an annular bender bimorph restrained at its outer edges by side springs 104 and 106. Energization by a calibration drive circuit such as 30 in FIG. 1 causes the central portion of the drive mechanism to flex thereby imparting an axial oscillation to coupling shaft 78 and connected probe element 76. The resulting motion of the pickup sensing member is substantially axial with length variation of the driver being taken up by flexure of the supporting reeds. A resilient bumper 120, suspended from the upper end of cavity 62 may be used to limit the upward extent of movement of sensing element 66 and to protect the drive mechanism against damage from accidental contact of sensing member rod 76.

As illustrated in FIG. 4, signal coupling and supporting shaft 78 extends through and beyond the upper and lower ends of signal coupling cylinder 70. Thus, the axial motion imparted by crystal driver 22 causes reciprocating rectilinear motion within the coupling cylinder. As previously explained, a substantially constant coupling capacitance exists between shaft 78 and cylinder 70.

Also, as explained, the motion imparted by drive member 22 is substantially axial with some small departure from pure axial motion being possible. However, by use of the coaxial coupling arrangement, small departures from pure rectilinear motion cause only negligible changes in the value of the coupling capacitance. (See FIG. 3a.)

Also included in pickup casing 60 is a portion of the transducer system electronic circuitry mounted on a circuit board 121 positioned within housing cavity 64. As previously mentioned, the capacitance C(S) between probe element 76 and the object under inspection is ordinarily quite small. Therefore, in order to insure that the small capacitance variations being measured are not masked below the level of noise resulting from inevitable stray capacitance associated with RF leads, at least the FM oscillator as described in connection with FIG. 1 is mounted on circuit board 121 in pickup cavity 64. In addition, to facilitate the coupling to the remainder of the circuitry remote from the pickup housing, there may also be included in the pickup itself a coupling circuit such as an emitter follower amplifier whereby a relatively long interconnecting cable between the FM oscillator and the demodulator can be employed.

Referring still to FIG. 4, electrical coupling between coupling cylinder 70 and the FM oscillator in cavity 64 is accomplished by means of a short wire 122 extending through a small opening 124 in the wall 126 between cavities 62 and 64. Since the coupling between the moving pickup and the fixed coupling cylinder is by the internal spacing in cylinder 70, use of wire 122 introduces no noise problems, no motion of this wire causes variation in the shunt capacitance between the wire and ground. Substantial advantage may be gained in many sittuations by this arrangement.

In operation, pickup 22 is rigidly mounted in close proximity to, but not in contact with, the object to be inspected. This may be done by any convenient means, as by a pair of threaded apertures 128 and 130 in pickup casing 60. A fine adjustment of the initial pickup to object spacing many be accomplished by adjusting the projection of probe element 76 in relation to signal coupling and support shaft 72.

Such adjustment may be facilitated by provision of a small radial aperture 132 in signal coupling cylinder 70 and an aligned aperture 134 in signal coupling and support shaft 78. This permits the insertion of a suitable antitorque or locking pin into shaft 78 whereupon stop nut 84 may be loosened and rod 76 located at the desired position. After stop nut 84 is retightened, the antitorque pin is removed and the pickup is ready for operation. As will be appreciated, use of the antitorque pin prevents loosening or other damage to the connection between shaft 78 and driver mechanism 68 during adjustment or replacement of rod 76.

A modified embodiment of the invention employing an inductive, rather than capacitive, pickup is shown schematically in FIG. 7. The inductive pickup, denoted at at 136, comprises a generally U-shaped magnetically permeable core portion 138 and an elongated probe element 140 positioned in an axial bore 142 in one arm 144 of U-shaped core 138. An oscillator 146 is inductively coupled to core arm 144 by means of an exciting coil 148 while a signal output is provided by a sensing coil 150 wound on the other core arm 152. Probe element 140 is coupled to a calibration drive mechanism 154 identical to that described in connection with FIG. 1 in order to provide an accurately controlled axial vibration for calibrating purposes.

As illustrated in FIG. 7, inductive pickup 136 is operatively positioned close to but not in contact with an object 156 under inspection with longer core arm 152 and the end of probe element 140 in close proximity to the object under inspection. As a result, a first air gap 158 exists between the object under inspection 156 and longer arm 152 of core 138 while a second air gap 160 exists between the object and the end of probe element 140. In addition, a coupling air gap exists between sensing element 140 through bore 142 in arm 144.

As in the case of the capacitive embodiment, axial motion of probe element 140 causes substantially no variation in the electrical parameters of the coupling since radial displacement of rod 140 toward one wall of bore 142 is accompanied by an equal displacement away from the diametrically opposite wall.

Pickup operation in the modified embodiment of FIG. 6 depends on the variation of the air gap reluctance between the end of probe element 140 and the object 156 under inspection due to instantaneous variations in the standoff distance S. Variation in the air gap 158 between the object under inspection and larger arm 152 of core 138 is made small by selection of a large cross sectional area of arm 152 in relation to the spacing between arm 152 and object 156, and in relation to the cross sectional area of probe element 140.

In the inductive embodiment, it is found that the reluctance of gap 160 must be substantially greater than the coaxial coupling reluctance in bore 142 to assure adequate sensitivity of the pickup to variations in the pickup to object spacing S.

In the operation of pickup 136, oscillator 146 provides an exciting magnetic field in shorter arm 144 of core 138. The resulting magnetic field flows through the U-shaped member with return paths being provided through air gaps 158 and 160 and through object 156 under inspection. As the pickup to object spacing S varies, either due to vibration or displacement of object 156 or due to the calibrating vibration produced by driver 154, the reluctance of the pickup to object air gap 160 varies. This produces an amplitude modulation of the magnetic field in the U-shaped core 138 with corresponding variation of the electrical signal induced into sensing coil 150. This signal may be employed directly as an input to a controlled gain amplifier, utilization device, and frequency control feedback loop, all as illustrated in FIG. 1. Amplitude demodulation of the measurement signal may then be employed to extract a signal actually representative of the desired pickup to object spacing variations.

While two specific embodiments employing the concepts of this invention are herein disclosed, it should be appreciated that various modifications, both as to the construction and relationship of the pickup sensing element and the coaxial signal coupler are contemplated as within the scope of this invention. Likewise, modifications of the electronic signal processing circuitry shown will also be possible. In regard to this, it should be pointed out that systems providing a variable standoff distance as described in the aforementioned application Ser. No. 515,533 to provide linearization and/or constant standoff distance for surface following are also contemplated for use with coaxial signal coupling as disclosed.

Thus, the invention may be embodied in other specific forms without departing from the spirit or essential characteristics thereof. The present embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed and desired to be secured by United States Letters Patent is:

1. An electrical pickup for measuring displacement and surface phenomenons in an object under inspection comprising: a pickup body; sensing means responsive to said phenomenons to be measured; means for movably supporting said sensing means relative to said body; electrical circuit means cooperating with said sensing means to produce a variable electrical signal in accordance with the sensing means response to said phenomenons; and means fixedly mounted in said body in noncontacting relationship with said sensing means and operative to provide energy coupling between said sensing means and said electrical circuit means, the coupling between said sensing means and said electrical circuit means being substantially constant independent of the phenomenons being observed and independent of the motion of said sensing means relative to said pickup body.

2. An electrical pickup as defined in claim 1 wherein said sensing means is adapted to be positioned in noncontacting relationship to the object under observation; and wherein said sensing means and said object cooperate to produce an electric field phenomenon representative of the instantaneous spacing between the object and the sensing means.

3. An electrical pickup as defined in claim 1 wherein said sensing means is adapted to be positioned in noncontacting relationship to the object under observation, and wherein said sensing means and said object cooperate to produce a magnetic field phenomenon representative of the instantaneous spacing between the object and the sensing means.

4. An electrical pickup as defined in claim 1 wherein said sensing means includes a slender elongated member; and wherein said energy coupling means includes a hollow portion surrounding a portion of said slender elongated member; said hollow portion being of sufficiently larger transverse dimension than said slender elongated member to maintain an air gap between said energy coupling means and said sensing means.

5. An electrical pickup as defined in claim 1 wherein said sensing means comprises a cylindrical member mounted in said pickup body and a probe portion protruding from said pickup to interact with said object under inspection; and wherein said energy coupling means comprises a hollow cylindrical member coaxially positioned around said sensing means, said sensing element being free to move within said cylinder, the internal diameter of said cylinder being sufficiently greater than the diameter of said sensing means to maintain a noncontacting relationship therebetween and to establish a capacitance between said sensing means and said cylinder, substantially independent of the movement of said sensing means.

6. An electrical pickup as defined in claim 5 wherein said sensing means is adapted to be maintained in noncontacting relationship with an object under inspection and to interact capacitively therewith as a function of the spacing between the probe portion and said object.

7. An electrical pickup as defined in claim 1 wherein said sensing means comprises means cooperating with said object under observation for establishing a distance sensitive capacitance and wherein said energy coupling means comprises means for establishing a second capacitance between said sensing means and said electrical circuit means in series with said distance sensitive capacitance.

8. An electrical pickup as defined in claim 7 wherein the capacitance between the sensing means and the electronic circuit means is substantially greater than said distance sensitive capacitance.

9. An electrical pickup as defined in claim 1 wherein said means for movably supporting said sensing means comprises a resilient suspension mounted in said pickup body, drive means mounted on said suspension, and means connecting said sensing means to said drive means; wherein said sensing means comprises an elongated electrically conductive member projecting out of said pickup body and electrical insulator means coupling one end of said elongated member to said drive means; and wherein said coupling means comprises a hollow tubular electrically conductive member attached to said pickup body and projecting outwardly with said elongated member disposed therein in substantially coaxial, noncontacting relationship, and means for maintaining said tubular member electrically isolated from said pickup body; said drive means being responsive to an electrical excitation to reciprocate said elongated member axially within said hollow tubular member and further including means for electrically coupling said hollow tubular member to the input of said electronic circuit means.

10. An electrical pickup as defined in claim 9 adapted to be mounted with the outer end of said elongated member in close proximity to but not in contact with said object under observation; wherein said elongated member and said object cooperate to form a sensing capacitance, the value of which depends on the instantaneous spacing between the sensing means and the object.

11. An electrical pickup as defined in claim 10 wherein said elongated member cooperates with said tubular member to define a coupling capacitance in series with said sensing capacitance, the value of said coupling capacitance being substantially in excess of the value of said sensing capacitance.

12. An electrical pickup as defined in claim 11 wherein said coupling capacitance is substantially constant, independent of small departures of said elongated member from true coaxial disposition within said tubular member.

13. An electrical pickup as defined in claim 11 wherein said drive means comprises a piezoelectric device having a metallic plate member, a pair of plates of piezoelectric material attached to opposite sides of said metallic member, electrical terminal means attached to said piezoelectric plates and electronic drive means for exciting said piezoelectric plates with an electrical signal of controlled frequency and amplitude through said terminal means; and wherein said electronic circuit means includes an electronic oscillator, the frequency of said oscillator being determined by the values of the sensing capacitance and the coupling capacitance.

14. An electrical pickup as defined in claim 1 wherein said coupling means comprises means surrounding a portion of the sensing means in noncontacting relationship, and forming an air gap with said sensing means movable therein; the energy coupling between said sensing means and said circuit means being effected through said air gap substantially independent of the motion or position of said sensing means.

15. An electrical pickup as defined in claim 14 wherein said air gap provides capacitive coupling between said sensing means and said circuit means.

16. An electrical pickup as defined in claim 14 wherein said air gap provides magnetic coupling between said sensing means and said circuit means.

17. An electrical pickup as defined in claim 1 wherein said sensing means comprises a member formed of magnetically permeable material adapted to be positioned in proximity to but not in contact with an object under inspection; and wherein said coupling means comprises a body of magnetically permeable material, said body having a hollow portion surrounding a portion of said sensing means, said hollow portion being of sufficient dimension relative to the sensing means to form an air gap, the coupling between said sensing means and said circuit means being substantially independent of the motion or the position of said sensing means; means for producing a magnetic field in said coupling means; and means connecting said coupling means to said circuit means for generating an electrical signal representative of the magnetic field in said coupling means body, the magnitude of said field being dependent in part on the instantaneous spacing between said sensing means and said object under inspection.

18. An electrical pickup as defined in claim 17 wherein said means for movably supporting said sensing means comprises a resilient suspension mounted in said pickup body, drive means mounted on said suspension, and means connecting said sensing means to said drive means; said drive means being responsive to an electrical excitation to reciprocate said sensing means toward and away from said object under inspection within the hollow portion of said coupling means body.

References Cited
UNITED STATES PATENTS
2,387,496  10/1945  Cornelius _____ 324—61X

FOREIGN PATENTS
152,073  1/1962  U.S.S.R. _____ 324—61

EDWARD E. KUBASIEWICZ, Primary Examiner

U.S. Cl. X.R.

324—34